(12) United States Patent
Kamiguchi et al.

(10) Patent No.: US 6,440,338 B1
(45) Date of Patent: Aug. 27, 2002

(54) METHOD, APPARATUS, AND MEDIUM FOR FORMING MOLDING CONDITION AND MOLDING MACHINE

(75) Inventors: Masao Kamiguchi; Tatsuhiro Uchiyama, both of Yamanashi; Katsuya Sakaba, Otsu; Shusaku Nishiyama; Ikushi Takasaki, both of Kawasaki, all of (JP)

(73) Assignees: Fanuc Ltd., Yamanashi; Fujitsu Limited, Kawasaki; Toray Industries, Inc., Tokyo, all of (JP)

( * ) Notice: Subject to any disclaimer, the term of this patent is extended or adjusted under 35 U.S.C. 154(b) by 0 days.

(21) Appl. No.: 09/549,169

(22) Filed: Apr. 13, 2000

(30) Foreign Application Priority Data

Apr. 13, 1999 (JP) .......................................... 11-105893

(51) Int. Cl.$^7$ .............................................. B29C 45/77
(52) U.S. Cl. ................................ 264/40.1; 264/328.13; 425/145; 425/149; 700/203
(58) Field of Search ............................ 264/40.1, 328.1, 264/328.13; 425/145, 149; 700/203

(56) References Cited

U.S. PATENT DOCUMENTS 5,296,179 A * 3/1994 Kamiguchi et al. ........ 264/40.1

FOREIGN PATENT DOCUMENTS

| EP | 0 436 732 | 7/1991 |
| EP | 0 531 532 | 3/1993 |
| JP | 59-111828 | * 6/1984 |

OTHER PUBLICATIONS

Patent Abstract of Japanese Patent 8–001744, publication date Jan 09, 1996.
Patent Abstract of Japanese Patent 11–048300, publication date Feb. 23, 1999.
Churchward, G., et al. "Control of Moulding Defects by Melt Flow Front Prediction." Engineering Plastics, GB, Rapra Technology, Shawbury, Shrewsbury, Shropshire, vol. 8, No. 2, 1995, pp. 124–135.
Sheth H.R., et al. "An Adaptive Control Methodology for the Injection Molding Process. Part 1: Material Data Generation." Journal of Injection Molding Technology, US, Society of Plastics Engineers, Brookfield, CT, vol. 2, No. 2, Jun. 1, 1998. pp. 86–94.

* cited by examiner

*Primary Examiner*—Jill L. Heitbrink
(74) *Attorney, Agent, or Firm*—Staas & Halsey LLP

(57) ABSTRACT

A resin flow analysis in a die is performed by CAE or the like to obtain a resin pressure curve at a resin inlet port or a resin pressure curve at a nozzle end portion of a molding machine. Injection (air shot) is performed while a nozzle is separated from a die, so that an injection pressure curve Pa to be detected at this time is obtained. From the injection pressure curve and the resin pressure curve, an injection pressure command curve serving as a molding condition in mass production is obtained. The resin pressure curve obtained by the resin flow analysis is compensated by the injection pressure curve in an air shot for a time lag and pressure loss caused by the mechanical elements of an injection molding machine, so that molding conditions in mass production can be easily obtained. In addition, a pressure loss at the nozzle portion is also obtained, so that an injection pressure command curve is obtained from the pressure loss, the injection pressure curve, and the resin pressure curve.

21 Claims, 6 Drawing Sheets

OUTPUT FLOW PATTERN, PRESSURE, TEMPERATURE, AND THE LIKE

METHOD, APPARATUS, AND MEDIUM FOR FORMING MOLDING CONDITION AND MOLDING MACHINE

BACKGROUND OF THE INVENTION

1. Field of the Invention

The present invention relates a method and apparatus for obtaining an injection pressure curve as a molding condition, and a recording medium on which the method is recorded. More particularly, the present invention relates to a method and apparatus for obtaining an injection pressure curve serving as a molding condition by using an injection pressure curve obtained by a resin flow analysis, and a computer readable storage medium which stores a program for causing a computer to execute the method.

2. Description of the Prior Art

There is known an injection pressure control system in which, in molding in an injection molding machine, a predetermined injection pressure curve in the injection (filling) step is set as one of molding conditions, and the injection pressure is controlled in the injection step so that the set injection pressure curve is equal to an actual injection pressure curve.

As a method of obtaining resin pressure at any position in a die by performing a flow analysis of resin in the die, resin flow analysis CAE (Computer Aided Engineering) is developed (see "Resin flow analysis CAE system" on pages 210 to 214 of the tenth revised edition of "Injection molding" edited by Itochu Corp. and two other persons and issued by Plastic Age Inc. on Aug. 10, 1993). In this resin flow analysis CAE, die temperature, flow rate of melted resin in a resin inlet port (nozzle end viewed from the injection molding machine side) in the die, and resin temperature are given as analysis conditions, and a flow analysis in the die is performed, so that pressure variations based on the resin inlet port are calculated.

Although a method of directly giving the analysis conditions to be given to the resin flow analysis CAE to a molding machine to perform molding is employed, since the mechanical characteristics of the injection molding machine and the compression behavior in the cylinder or nozzle of the injection molding machine are not reflected on the molding conditions, the results of the resin flow analysis cannot be directly used as mass production conditions.

In general in the injection molding machine, a pressure sensor for detecting pressure variations is attached to the rear end portion of a screw, and a nozzle portion, a cylinder portion, and the like are arranged between the resin inlet port of the die and the pressure sensor. Since the nozzle end portion (portion coming into contact with the die) is sharply constricted in many cases, though the pressure is detected by the pressure sensor immediately after the screw moves forward, the resin is simply compressed in the nozzle and a flow into the die does not occur at then, so that a time lag between the screw movement and the output of pressure within the die takes place in general.

FIG. 1 is a schematic diagram of an injection mechanism of an injection molding machine to which an injection pressure control method is applied. In FIG. 1, a die 1, a cylinder 2, a screw 3, a hopper 4 for supplying pellets of resin into the cylinder, a front plate 5 constituting the injection mechanism, a rear plate 6, a plurality of guide bars 7 arranged between the front plate 5 and the rear plate 6 are arranged, and a pressure plate 8 is guided by the guide bars 7 and arranged such that the pressure plate 8 is movable forward and backward (the left and right directions in FIG. 1). The base portion of the screw 3 is pivotally attached to the pressure plate 8, and a pulley is attached to the base portion, and the screw 3 is rotationally driven by a screw rotation servo motor M1 through a drive pulley, a timing belt, and the like. A ball nut 10 is attached to the pressure plate 8 through a pressure sensor 9 (load cell), a ball screw 11 is meshed with the ball nut 10, and the ball screw 11 is rotationally driven by an injection servo motor M2 through a drive pulley, a timing belt, and a driven pulley.

In the injection step, the injection servo motor M2 is driven, the ball screw 11 is rotated, the ball nut 10 meshed with the ball screw 11 and the pressure plate 8 move forward (in the left direction in FIG. 1), and the screw 3 moves forward to inject melted resin in the cylinder 2 into the cavity of the die 1. At this time, although the injection pressure is detected by the pressure sensor (load cell) 9, the resin pressure detected by the pressure sensor (load cell) 9, i.e., the injection pressure, is that at the rear end portion of the screw 3, and is not resin pressure at the resin inlet port of the die 1. As a result, the pressure detected by the pressure sensor 9 is different from the resin pressure at the resin inlet port of the die 1, the pressure which serves as a reference of the resin flow analysis in the CAE.

A nozzle 12, the melted resin in the cylinder 2, the screw 3, and the pressure plate 8 are interposed between the point at which the resin pressure is detected by the pressure sensor and the resin inlet port of the die 1. For this reason, a pressure loss is generated between the point at which the resin pressure is detected by the pressure sensor and the resin inlet port, and a flow of the resin into the die delays because the nozzle end is sharply reduced in diameter so that the resin is compressed in the nozzle. When the pressure in the nozzle increases to some extent, the resin passes through the nozzle portion and is injected into the die. For these reasons, after the injection is started, a lag time between the detection of the pressure by the pressure sensor 9 and the output of the pressure in the die is generated.

For these reasons, the results of the CAE related to the pressure at the resin inlet port of the die cannot be directly used as molding conditions, compensation for the time lag discussed above and compensation for the pressure loss must be performed by any method.

OBJECTS AND SUMMARY OF THE INVENTION

It is an object of the present invention to make it possible to obtain an injection pressure curve of molding conditions by a simple method using resin flow analysis results obtained by the CAE.

In order to achieve the above object, there is provided an injection molding condition forming method including the step of obtaining a resin pressure curve at a resin inlet port of a die by a resin flow analysis for analyzing a flow of resin in the die; the step of obtaining an injection pressure curve in an air shot; and the step of obtaining an injection pressure curve serving as a molding condition based on the injection pressure curve in the air shot and the resin pressure curve obtained by the resin flow analysis.

According to another aspect of the present invention, there is provided an injection molding condition forming method in an injection molding machine wherein, in the step of obtaining an injection pressure curve serving as the molding condition, the injection pressure curve in the air shot is used as the injection pressure curve serving as the molding condition during a lag time between the start of injection by the molding machine and injection of resin from the nozzle end, and thereafter, the resin pressure curve at the resin inlet port of the die and the injection pressure curve in the air shot are added to each other, and the addition result is used as the injection pressure curve serving as the molding condition There is provided an injection molding condition forming method in an injection molding machine further including the step of calculating a pressure loss curve in an area extending from the pressure sensor to the resin inlet port of the die by the resin flow analysis, and wherein, in the step of obtaining an injection pressure curve serving as the molding condition, the injection pressure curve in the air shot is used as the injection pressure curve serving as the molding condition during a lag time between the start of injection by the molding machine and injection of resin from the nozzle end, and thereafter, the resin pressure curve at the resin inlet port of the die and the pressure loss curve in the area extending from the pressure sensor to the resin inlet port of the die are added to each other, and the addition result is used as the injection pressure curve serving as the molding condition.

According to still another aspect of the present invention, there is provided an injection molding condition forming method in an inject molding machine including the step of obtaining a resin pressure curve of a cylinder-side end of a molding machine nozzle portion obtained by a resin flow analysis using a resin flow path in a die and the nozzle portion of the molding machine as objects to be analyzed; the step of obtaining an injection pressure curve in an air shot; and the step of obtaining an injection pressure curve serving as a molding condition based on the injection pressure curve in the air shot and the resin pressure curve obtained by the resin flow analysis.

According to still another aspect of the present invention, there is provided an injection molding condition forming method in an injection molding machine wherein, in the step of obtaining an injection pressure curve serving as the molding condition, the injection pressure curve in the air shot is used as the injection pressure curve serving as the molding condition during a lag time between the start of injection by the molding machine and injection of the resin from a nozzle end, and thereafter, the resin pressure curve obtained by the resin flow analysis is used as the injection pressure curve serving as the molding condition.

According to still another aspect of the present invention, there is provided an injection molding condition forming method wherein, in at least the resin flow analysis of the nozzle portion, an analysis in consideration of a pressure dependence of a resin viscosity is performed.

According to still another aspect of the present invention, there is provided a molding condition forming method in an injection molding machine wherein, in the step of obtaining an injection pressure curve in the air shot, the injection pressure curve is formed under a new condition based on known air shot injection pressure curves data stored in storage means in which known injection pressure curves data in air shots that are actually measured under various conditions are stored.

According to still another aspect of the present invention, there is provided a molding condition forming method in an injection molding machine wherein, in the step of obtaining an injection pressure curve m the air shot, an injection pressure curve in an air shot with respect to a resin temperature and an injection velocity of the molding conditions in the molding is formed by interpolating actually measured injection pressure curves data for air shots performed at s plurality of levels of resin temperatures and injection velocities for the same shape of the cylinder and that of the nozzle of the molding machine and the same resin to use.

According to still another aspect of the present invention, there is provided an injection molding machine including means for storing a resin pressure curve at a resin inlet port of a die calculated by a resin flow analysis for analyzing a flow of resin in the die; means for obtaining an injection pressure curve in an air shot; and means for obtaining an injection pressure curve serving as a molding condition based on the injection pressure curve in the air shot and the resin pressure curve obtained by the resin flow analysis.

According to still another aspect of the present invention, there is provided an injection molding machine wherein, in the means for obtaining an injection pressure curve serving as the molding condition, the injection pressure curve in the air shot is used as the injection pressure curve serving as the molding condition during a lag time between the start of injection by the molding machine and injection of resin from a nozzle end, and thereafter, the resin pressure curve at the resin inlet port of the die and the injection pressure curve in the air shot are added to each other, and the addition result is generated as the injection pressure curve serving as the molding condition.

According to still another aspect of the present invention, there is provided an injection molding machine further including the means for performing a resin flow analysis to a pressure loss curve in an area extending from a pressure sensor to the resin inlet port of a die, and wherein, in the means for obtaining an injection pressure curve serving as the molding condition, the injection pressure curve in the air shot is used as the injection pressure curve serving as the molding condition during a lag time between the start of set injection and injection of resin from a nozzle end, and thereafter, the resin pressure curve at the resin inlet port of the die and the pressure loss curve extending from the pressure sensor to the resin inlet port of the die are added to each other, and the addition result is generated as the injection pressure curve serving as the molding condition According to still another aspect of the present invention, there is provided an injection molding machine including: means for storing a resin pressure curve of a cylinder-side end of a nozzle portion of molding machine obtained by a resin flow analysis using a resin flow path in a die and a nozzle portion of the molding machine as objects to be analyzed; means for obtaining an injection pressure curve in an air shot; and means for obtaining an injection pressure curve serving as a molding condition based on the injection pressure curve in the air shot and the resin pressure curve obtained by the resin flow analysis.

According to still another aspect of the present invention, there is provided an injection molding machine wherein, in the means for obtaining an injection pressure curve serving as the molding condition, the injection pressure curve in the air shot is used as the injection pressure curve serving as the molding condition during a lag time between the start of injection and injection of the resin from a nozzle end, and thereafter, an injection pressure curve is generated by using the resin pressure curve obtained by the resin flow analysis as the molding condition.

According to still another aspect of the present invention, there is provided an injection molding machine further including storage means for storing injection pressure curve data in an air shot and actually measured under various conditions, and wherein, in the means for obtaining an injection pressure curve in the air shot, an injection pressure curve under a new condition is formed based on known air shot injection pressure curves data stored in storage means.

According to still another aspect of the present invention, there is provided an injection molding machine further including storage means for storing actually measured injection pressure curves data in air shots performed at a plurality of levels of resin temperature and injection velocities for the same shape of the cylinder and that of the nozzle of the molding machine and the same resin, and wherein, in the means for obtaining an injection pressure curve in the air shot, the actually measured injection pressure curves data stored in the storage means are interpolated, so that an injection pressure curve in an air shot with respect to a resin temperature and an injection velocity of the molding conditions in the molding is formed.

According to still another aspect of the present invention, there is provided an injection molding condition forming apparatus comprising a resin flow analyzing device for obtaining a resin pressure curve at a resin inlet port of a die by a resin flow analysis for analyzing a flow of resin in the die and an injection molding machine for obtaining an injection pressure curve in an air shot, wherein the injection molding machine calculates an injection pressure curve serving as a molding condition based on the resin pressure curve given by the resin flow analyzing device and the injection pressure curve in the air shot.

According to still another aspect of the present invention, there is provided an injection molding condition forming apparatus comprising a resin flow analyzing device for obtaining a resin pressure curve of a cylinder-side end of a molding machine nozzle portion by a resin flow analysis using a resin flow path in a die and the nozzle portion of the molding machine as objects to be analyzed and an injection molding machine for obtaining an injection pressure curve in an air shot, wherein the injection molding machine calculates an injection pressure curve serving as a molding condition based on the resin pressure curve given by the resin flow analyzing device and the injection pressure curve in the air shot.

According to still another aspect of the present invention, there is provided a computer readable storage medium which stores a program for causing a computer of a control device for controlling an injection molding machine to execute: the step of obtaining a resin pressure curve at resin inlet port of a die by a resin flow analysis for analyzing a flow of resin in the die; the step of obtaining an injection pressure curve in an air shot; and the step of obtaining an injection pressure curve serving as a molding condition based on the resin pressure curve obtained by the resin flow analysis and the injection pressure curve in the air shot.

According to still another aspect of the present invention, there is provided a computer readable storage medium which stores a program for causing a computer of a control device for controlling an injection molding machine to execute: the step of obtaining an injection pressure curve in an air shot; and the step of obtaining an injection pressure curve serving as a molding condition based on the injection pressure curve in the air shot obtained in the above step and a resin pressure curve at a resin inlet port of a die obtained by a resin flow analysis for analyzing an input flow of resin in the die.

According to still another aspect of the present invention, there is provided a computer readable storage medium which stores a program for causing a computer of a control device for controlling an injection molding machine to execute: the step of obtaining a resin pressure curve of a cylinder-side end of a nozzle portion of a molding machine obtained by a resin flow analysis using a resin flow path in a die and the nozzle portion of the molding machine as objects to be analyzed; the step of obtaining an injection pressure curve in an air shot; and the step of obtaining an injection pressure curve serving as a molding condition based on the resin pressure curve obtained by the resin flow analysis and the injection pressure curve in the air shot.

According to still another aspect of the present invention, there is provided a computer readable storage medium which stores a program for causing a computer of a control device for controlling an injection molding machine to execute: the step of obtaining an injection pressure curve in an air shot; and the step of obtaining an injection pressure curve serving as a molding condition based on the injection pressure curve in the air shot obtained in the above step and a resin pressure curve at a cylinder-side end of the molding machine nozzle portion obtained by a resin flow analysis using an input resin flow path in a die and the nozzle portion of the molding machine as objects to be analyzed.

BRIEF DESCRIPTION OF THE DRAWINGS

Other objects and characteristic features of the present invention described above will be apparent from the following description of embodiments with reference to the accompanying drawings. These drawings include.

DETAILED DESCRIPTION OF THE PREFERRED EMBODIMENTS

Figure 1:
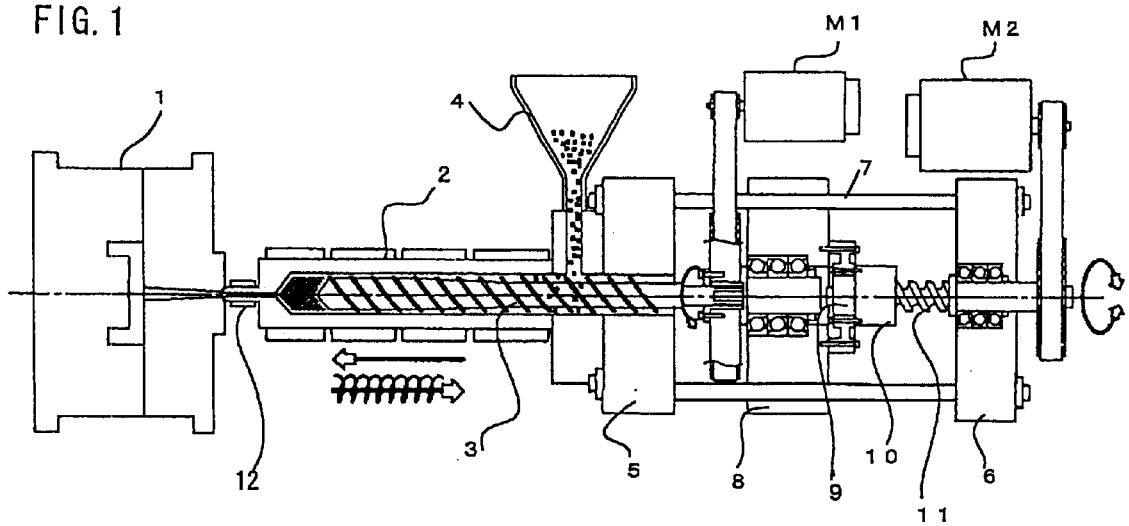
FIG. 1 is a schematic diagram of the mechanism of an injection molding machine.
Figure 2:
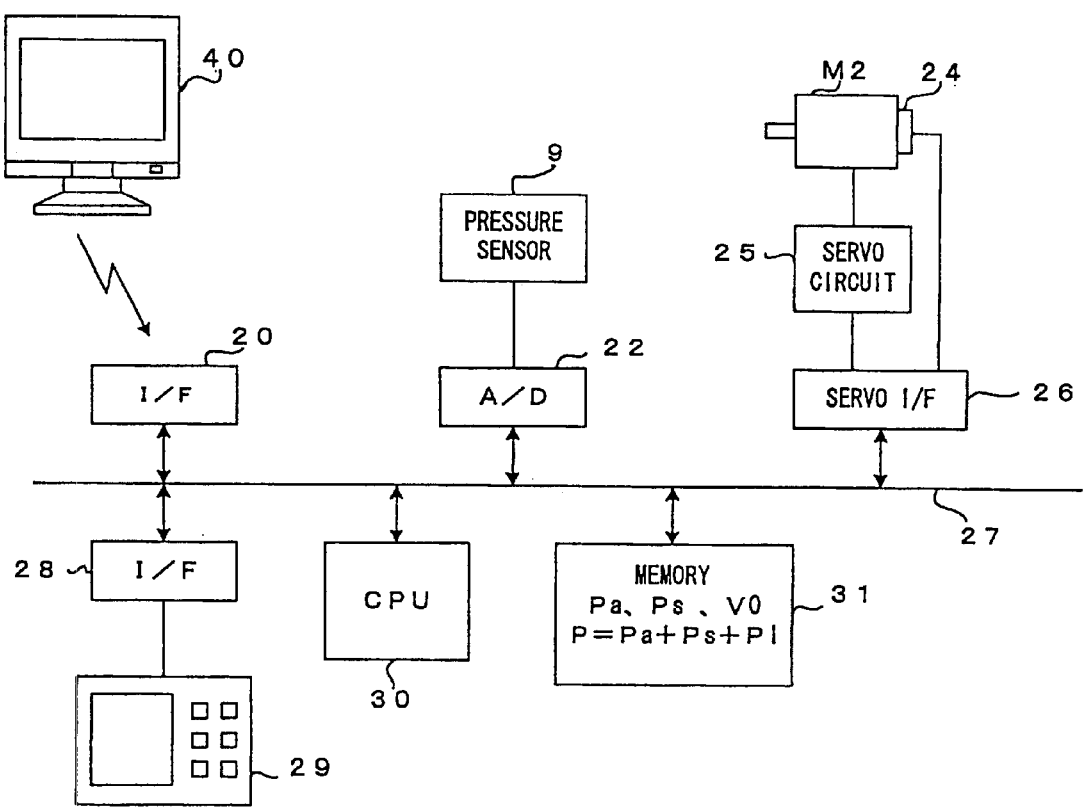
FIG. 2 is a schematic diagram of a main part of a control device of the injection molding machine.

The hardware configuration of an injection molding machine is the same as the conventional configuration as shown in FIG. 1. The configuration of a control device for controlling the injection molding machine is shown in FIG. 2. The control device constituted by a computer system is not different from the conventional control device. The present invention is different from the prior art in that a process for obtaining an injection pressure curve serving as a molding condition executed by the processor of the control device is added.

In FIG. 2, a communication interface 20, an input/output interface 28, an A/D converter 22, a servo interface 26, and a memory 31 constituted by a ROM, a RAM, a nonvolatile RAM, and the like are connected to a processor 30 for entirely controlling the injection molding machine shown in FIG. 1 through a bus 27. A CAE system 40 is connected to the communication interface 20 by wire, the data of resin flow analysis results, which are obtained by the CAE system 40, of resin in a die 1 being in use is transmitted to the communication interface 20, so that the data is stored in the nonvolatile RAM unit in the memory 31. An input/output device 29 having a display means constituted by a liquid crystal or a VDT is connected to the input/output interface 28. Setting or the like of various commands and various parameters can be performed, and the display means is designed such that monitor data such as various set values and an injection pressure curve (waveform) can be displayed on the display means.

A servo circuit 25 and a pulse recorder 24 serving as a position/speed detector attached to each servo motor are connected to the servo interface 26. A servo motor M2 is connected to the servo circuit 25. In FIG. 2, only the injection servo motor M2 and the servo circuit 25 are shown, and other servo motors and other servo circuits are omitted. The servo circuit may be constituted by only hardware such as an electric circuit or the like, may be constituted by a processor, a ROM, a RAM, and the like, or may also be constituted by a so-called digital servo circuit for controlling the position, speed, torque, and the like of a servo motor with software.

The configuration described above is the same as that of the control device of the conventional injection molding machine. In the injection step, the injection servo motor M2 is driven and controlled based on a set injection pressure curve (injection pressure data) P and a set injection velocity pattern (injection velocity data) V stored in the memory 31.

Figure 3:
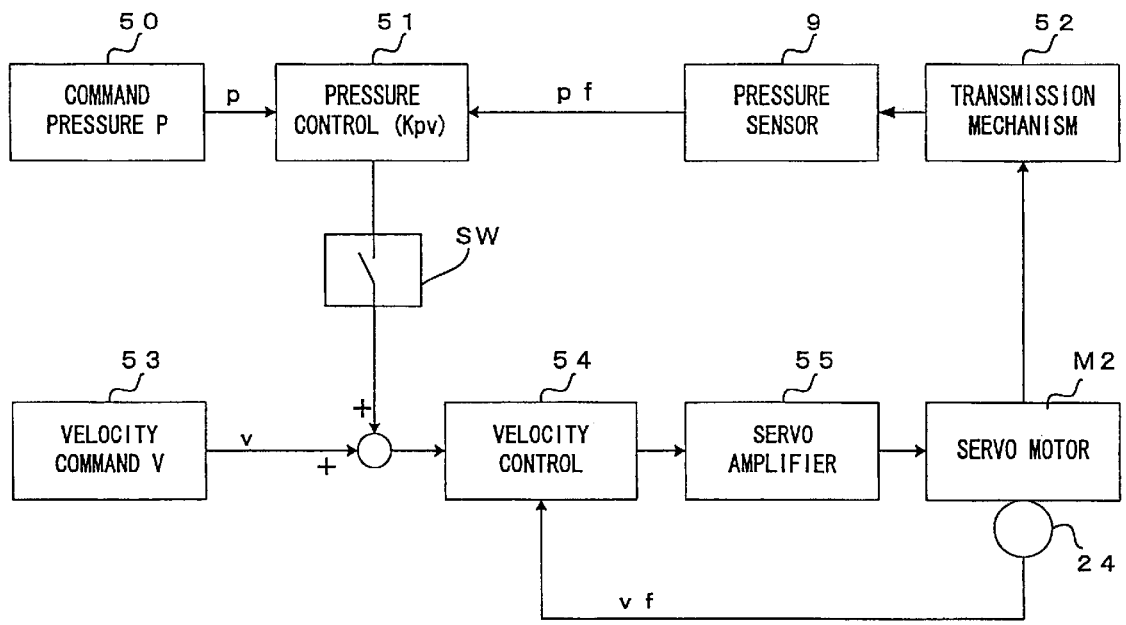
FIG. 3 is a block diagram showing control in the injection step of the injection molding machine.

FIG. 3 is a block diagram of a driving control system for the injection servo motor M2 in the injection step which is conventionally executed. When the injection step is controlled by only a velocity command pattern, a switch SW is turned off. When the velocity command is corrected by pressure feedback control, the switch SW is turned on.

A velocity command v is outputted according to the set injection velocity pattern V (see block 53). The velocity feedback control such as proportion, integration, or the like is performed based on the velocity command v and a feedback velocity vf obtained from the pulse recorder 24 of the position speed detector for detecting the position and speed of the servo motor attached to the injection servo motor M2 (see block 54) to obtain a torque command, so that the injection servo motor M2 is driven through a servo amplifier 55.

When the injection servo motor M2 is driven, a screw 3 moves forward through transmission mechanisms (block 52) such as a ball screw 11, a ball nut 10, a pressure sensor (load cell) 9, a pressure plate 8, and the like, and melted resin is injected into the die 1. At this time, the injection pressure (pressure acting on the melted resin) is detected by the pressure sensor 9. Pressure control is performed (block 51) in such a manner that the deviation between a target pressure p obtained by the set injection pressure curve P (block 50) and a pressure pf detected by the pressure sensor 9 is multiplied by a gain Kpv, which is a coefficient for conversion from a pressure to a velocity, so as to obtain a correction amount. When the switch SW is set in an ON state, the calculated correction amount is added to the velocity command v to correct it.

Subsequently, the speed of the injection servo motor M2 is controlled while the velocity command is corrected by a pressure deviation, and driving control is performed such that the detected injection pressure is equal to the set injection pressure curve. When correction by the pressure feedback control is not performed, the switch SW is set in an OFF state.

The processes up to the pressure control (block 51) in which a correction amount is calculated by the target pressure p obtained by the set injection pressure curve P (block 50) and the pressure pf detected by the pressure sensor 9 and the process in which the velocity command v is corrected by adding the correction amount to the velocity command v obtained from the set injection velocity pattern V to obtain the corrected velocity command v are executed by the processor 30. The velocity command v is outputted to the servo circuit 25 through the servo interface 26, so that velocity feedback control of block 54 is performed by the servo circuit 25.

Injection velocity and injection pressure controls in the injection step described above are the same as those conventionally executed. The present invention make it easy to obtain an injection pressure curve (injection pressure data) serving as a molding condition for performing control in the injection by using a resin pressure at a resin inlet port of a die, obtained by a resin flow analysis for analyzing a flow of resin in the die.

Figure 4:
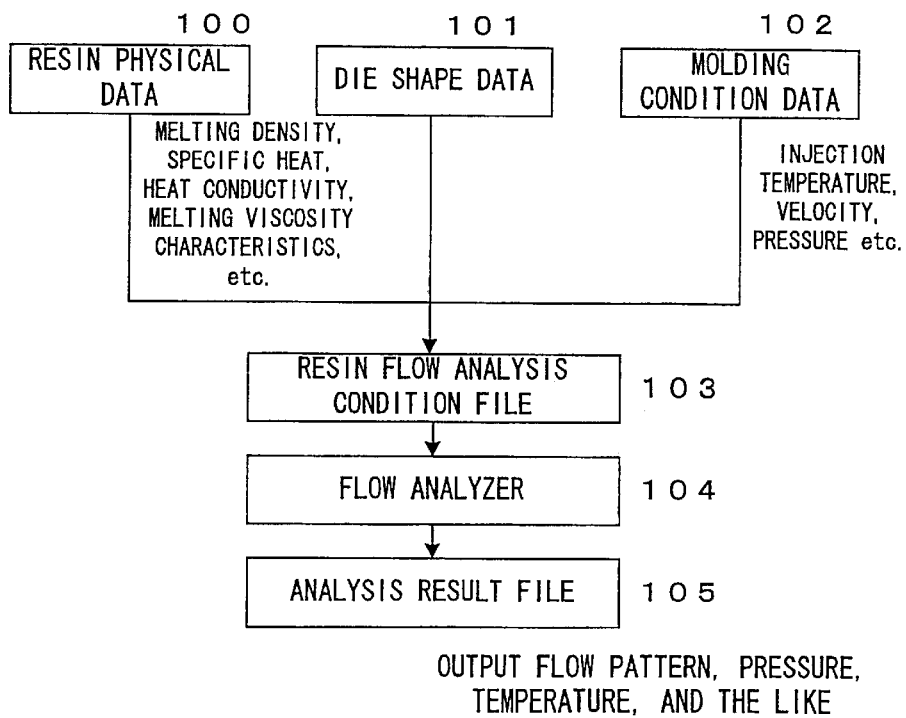
FIG. 4 is a flow chart of a resin flow analysis.

FIG. 4 is a flow chart of an injection molding CAE system. Resin characteristics data 100, die shape data 101, and molding condition data 102 are data required to form a resin flow analysis condition file 103 used for performing a flow analysis in a flow analyzer 104. The resin characteristics data 100 includes thermal characteristics such as the melting density, specific heat, heat conductivity of the resin, viscosity characteristics in melting, and the like. The die shape data 101 includes the shape data of a resin flow path such as a sprue, a runner, and a cavity, and is generally modeled by one-dimensional, two-dimensional, or three-dimensional elements. The molding condition data 102 includes a resin temperature, an injection velocity, an injection uppermost pressure, a die temperature, and the like. These data 100 to 102 are stored in a storage means. A flow analysis is executed in the flow analyzer 104 based on these data to form an analysis result file 105, and a flow pattern of the resin flow path subjected to the analysis, pressure and temperature at any position, and the like can be obtained.

In the present invention, a resin flow analysis in the die being in use is executed by the CAE system 40, and resin pressure data (resin pressure curve) Ps, which is obtained as the results, at a resin inlet port (inlet port of resin from a nozzle 12) of the die 1 and injection velocity data (velocity curve) VO used in the resin flow analysis are stored in the nonvolatile memory portion of the memory 31. The relationship between the injection velocity of the screw of the injection molding machine and the resin velocity at the resin inlet port of the die (this relationship can be calculated by a ratio of the sectional area (sectional area of a nozzle hole) of the resin inlet port of the die to the sectional area of the inside diameter of a cylinder) is set in the memory 31 as the form of a proportional constant. The lag time between the start of injection and injection of a melted resin from the nozzle end is measured in advance. The processor 30 divides the measured lag time by a sampling period of injection control (to be described later), and stores the lag time as the number of sampling periods (N delay).

The lag time is measured by executing air shot (to be described later), or is experimentally measured by attaching a pressure sensor to the resin inlet port of the die and performing a normal injection.

Figure 5:
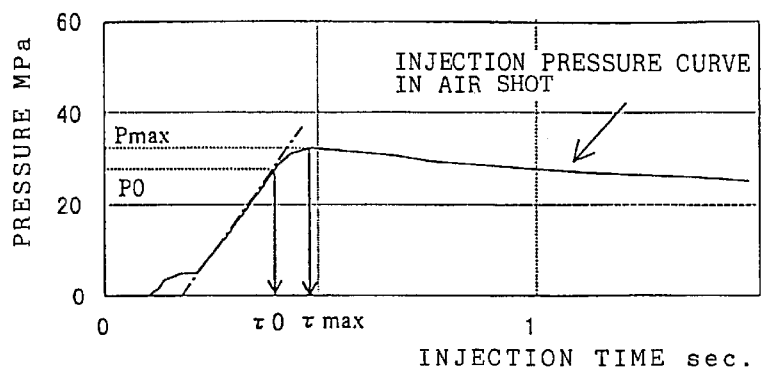
FIG. 5 is a graph of an injection pressure in an air shot.

When the lag time is measured by performing air shot, an injection operation is photographed on a VTR, and the time between the start of forward movement of the screw and injection of the resin from the nozzle end is measured. Or, as shown in FIG. 5, injection pressure during an air shot is measured by the pressure sensor 9, and a period of time from the start of injection to a point of time τmax at which the pressure is maximum is set as a lag time, or a period of time from the start of injection to a point of time τ0 at which a time gradient of the pressure which is considered to represent a volume compressibility varies from the straight line may be set as the lag time. The point of time at which the time gradient varies from the straight line may be determined to be the first point of time at which the quadratic differential value (time gradient of time gradient of pressure) of the pressure (the time gradient of the time gradient of the pressure) is almost 0 (e.g., 0.1) Pa/sec$^2$ in the direction in which time is turn back from the point of time at which the injection pressure is maximum during air shot.

In addition, as will be described later, a lag time may be set by estimating an injection pressure in the course of an air shot under present injection conditions with reference to an injection pressure in the course of an air shot which has been measured by using the same molding machine and the same resin.

When the pressure sensor is attached to the resin inlet port of the die, normal injection is performed, and a period of time from the start of forward movement of the screw to detection of a pressure by the pressure sensor attached to the resin inlet port of the die is measured. This measured time is set as a lag time.

In this case, when the injection velocity data (velocity curve) V0 used in the resin flow analysis is stored in the nonvolatile memory portion of the memory 31, the processor 30 multiplies the injection velocity data (velocity curve) by the proportional coefficient described above to convert the injection velocity data (velocity curve) into the injection velocity of the screw. In addition, the processor 30 adds the initial value of the injection velocity for the period of the lag time (adds the velocity command of the first stage of the injection velocity curve for the period of the lag time) to form injection velocity command data (velocity curve) V, and stores the injection velocity command data (velocity curve) V in the nonvolatile memory portion of the memory 31.

The injection unit is moved backward so that the nozzle 12 is separated from the die 1 or so that the die is opened. In this state, injection is performed by using the set injection velocity pattern (velocity curve) V, which is stored in the nonvolatile memory portion of the memory 31. In this case, correction by using an injection pressure is not performed, and only velocity control is performed. More specifically, in FIG. 3, injection control is performed in a state in which the switch SW is in an off state. This injection operation is called air shot, hereinafter. Furthermore, in the air shot, an injection pressure is detected by the pressure sensor 9, and the processor stores the injection pressure in the memory 31 through the A/D converter 22.

Figure 6:
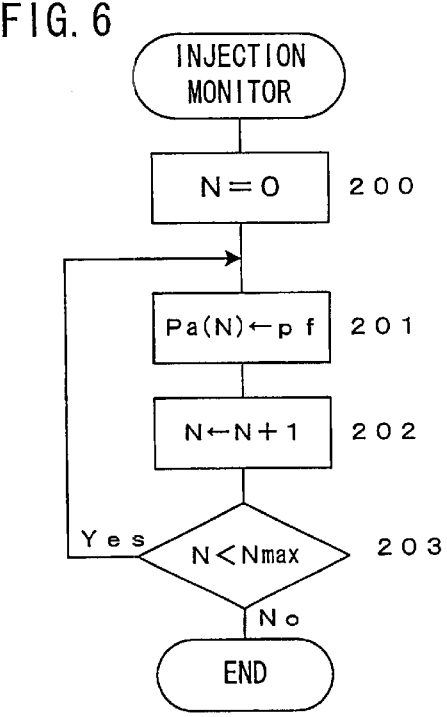
FIG. 6 is a flow chart of an injection pressure monitor process in which an air shot is executed.

FIG. 6 is a flow chart of an injection monitor process, which is performed by the processor 30, for detecting an injection pressure curve in the air shot. The program for this process is stored in the memory 31 in advance.

When an injection pressure monitor with an air shot command is given, the processor 30 triggers an air shot under the conditions described above, while it clears a counter N representing time discretely sampled by a sampling period to be "0" (step 200), and starts to store the injection pressure pf inputted through the A/D converter 22 after detected by the pressure sensor 9 as data Pa(N) of the Nth sampling of the air shot injection pressure pattern (step 201). The processor 30 increments the counter N by "1" (step 202), and checks whether the value of the counter N exceeds the number Nmax that is a sum of the number of sampling actions Ndelay for the lag time and the number N0 of data of the resin pressure at the resin inlet port obtained by the resin flow analysis (step 203). The processor 30 executes the processes in step 201 through step 203 every sampling period until the value of the counter N exceeds the number Nmax. In this manner, air shot injection pressure pattern data Pa(0) to Pa(Nmax) are obtained.

On the other hand, an injection pressure curve in an air shot under the present conditions may be computed and used utilizing the existing injection pressure curve recorded on a database which has been stored in a storage means such as the memory 31, without actually performing an air shot based on the present molding conditions. For example, the injection pressure curve in an air shot can also be calculated through interpolation with air shots data under various resin temperatures and injection velocities for the same shapes of the cylinder and that of the nozzle of the molding machine and the same resin.

The injection pressure curve in an air shot is uniquely determined by an injection velocity and a resin temperature. Since the injection time in an air shot changes depending on the injection velocity, the interpolating operation is performed for a screw position, not for time. In other words, positioning is performed by a data number discretely sampled by a sampling time.

Reference symbol N is set as the number of data discretely sampled, and the injection pressure in an air shot is represented by Pa(N). Suppose air shot data in which resin temperatures are actually measured as Ti (i=1 ... m) with m levels and injection velocities are actually measured as Vj(j=1 ... n) with n levels exist. In order to obtain the pressure Pa(N) having a resin temperature T and an injection velocity V, Pa(Ti, Vj), Pa(Ti, Vj+1), Pa(Ti+1, Vj'), and P(Ti+1, Vj'+1) (Ti<T<Ti+1, Vj<V<Vj+1, Vj'<V<Vj'+1), are determined first. The pressure Pa(N) to be obtained is calculated through linear approximation with the temperature and the velocity based on these four existing data with Equation (1). In this method, the larger number of the levels of the known injection velocities and resin temperatures, the more accurate the approximation is. Here, supposing $$Pi,j(N)=Pa(Ti, Vj)$$

$$Pi,j+i(N)=Pa(Ti, Vj+1),$$

$$Pi+1,j'(N)=Pa(Ti+1, Vj'),$$

and $$Pi+1,j'+1(N)=Pa(Ti+1, Vj'+1)$$

We have, $$Pa(N)=Pa2(N)+(Pa2(N)-Pa1(N))\times(T-Ti+1)/(Ti-Ti+1) \quad (1)$$

Where, $$Pa1(N)=Pi,j(N)+(Pi,j+1(N)-Pi,j(N))\times(V-Vj)/(Vj+1-Vj)$$

$$Pa2(N)=Pi+1,j'(N)+(Pi+1,j'+1(N)-Pi+1,j'(N))\times(V-Vj')/(Vj'1-Vj').$$

Figure 8:
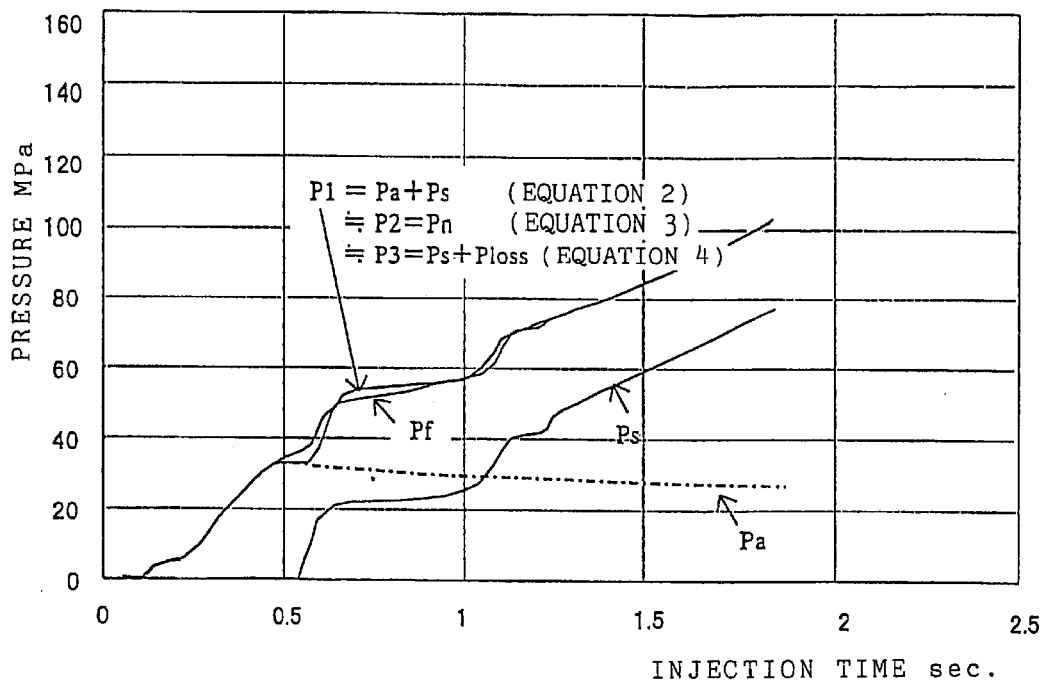
FIG. 8 is a graph showing the waveforms of various injection pressures in the injection molding machine.

FIG. 8 is a schematic illustration showing injection pressure obtained when a nylon resin having a low compressibility is injected and molded at a constant injection velocity in a die for a plate product through a side gate in this embodiment. Reference symbol Ps in FIG. 8 denotes resin pressure data (resin pressure curve) at the resin inlet port (inlet port of resin from the nozzle 12) of the die 1 obtained by a resin flow analysis. Reference symbol Pa in FIG. 8 denotes injection pressure data (injection pressure curve) in an air shot.

In this manner, when the injection pressure data (injection pressure curve) Pa with an air shot is obtained, the processor 30 automatically, or triggered by a pressure analysis command, starts a pressure synthesizing process for obtaining the injection pressure P serving as a molding condition. In the pressure synthesizing process for obtaining the injection pressure data, an operation expressed by the following equation (2) is performed based on the injection pressure data (injection pressure curve) Pa obtained with an air shot and the resin pressure Ps calculated by the resin flow analysis to calculate injection pressure data P1:

$$P1(N) = \begin{cases} Pa(N) & (N < \text{Ndelay}) \\ Pa(N) + Ps(N - \text{Ndelay}) & (N \geq \text{Ndelay}). \end{cases} \quad (2)$$

Figure 7:
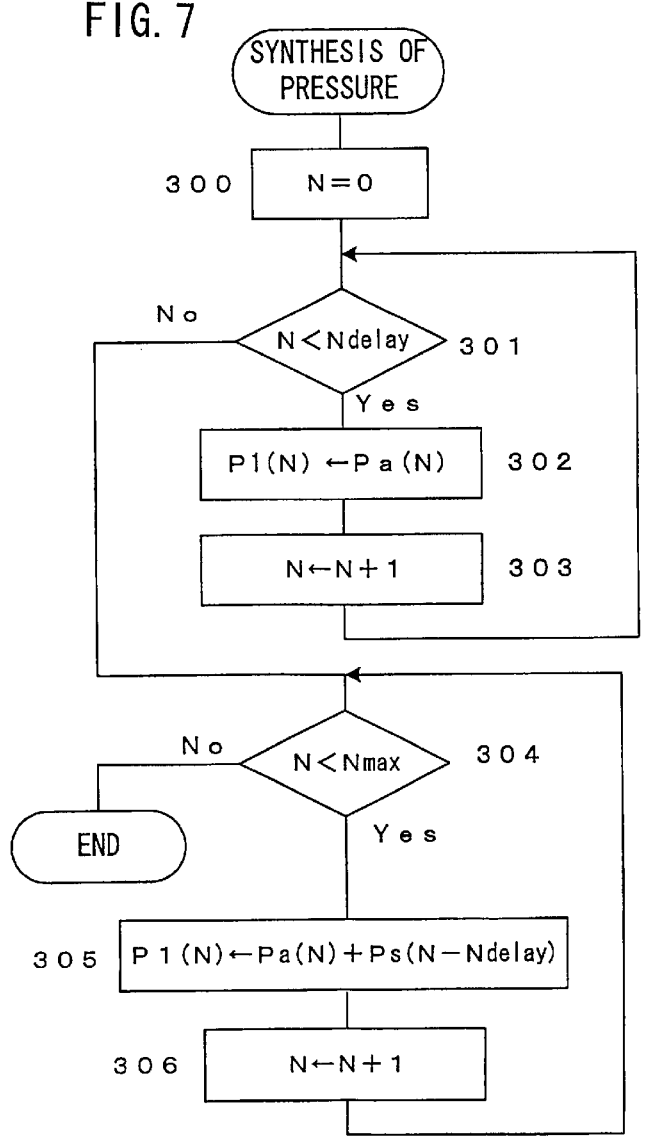
FIG. 7 is a flow chart of a process of obtaining injection pressure specification data (injection pressure command curve) of molding conditions for mass production.

FIG. 7 is a flow chart of the pressure synthesizing process. The program of this process has been stored in the memory 31 in advance. First, the processor 30 dears the counter N to be "0" (step 300), and checks whether the value of the counter N is smaller than the number of sampling actions Ndelay corresponding to the set lag time. If the value of the counter N is smaller than the number Ndelay, the processor 30 stores the data of the air shot monitor injection pressure data Pa(N) as injection pressure data P1(N) of a target pressure curve in mass production, increments the counter N by "1" (steps 302 and 303), and returns to step 301. Subsequently, the processor 30 repeatedly executes the processes in steps 301 to 303 until the value of the counter N is equal to or larger than the number of sampling actions Ndelay corresponding to the lag time.

If the value of the counter N is equal to or larger than the number of sampling actions Ndelay, the processing proceeds to step 304, and the processor 30 checks whether the value of the counter N is smaller than a number Nmax that is a sum of the number of sampling actions for the lag time and the number of resin pressure data obtained by the resin flow analysis described above. If the value of the counter N is smaller than the number Nmax, the processor 30 adds resin pressure data (resin pressure curve) Ps(N–Ndelay) obtained by subtracting the number of sampling actions Ndelay for the lag time from the value of the counter N to the air shot monitor injection pressure data Pa(N) corresponding to the value of the counter N, and stores the injection pressure data P1(N) serving as a target value (step 305). The processor 30 adds "1" to the value of the counter N (step 306), and returns to step 304. Subsequently, the processor 30 repeatedly executes the processes in steps 304 to 306 until the value of the counter N is equal to or larger than the number Nmax, adds the injection pressure data Pa(N) obtained with an air shot to the injection pressure data (resin pressure curve) Ps(N) obtained by the resin flow analysis in the die to obtain injection pressure data P1(N) serving as a target injection pressure curve P. The injection pressure data P1(N) calculated in this manner is the curve indicated by P1 in FIG. 8.

When molded products are to be actually mass-produced, the injection pressure data P1(N) and velocity command data (velocity curve) V obtained by the injection velocity data (velocity curve) used in the resin flow analysis are used as molding conditions, and a switch SW6 in FIG. 3 is turned on. Subsequently, an operation, shown in FIG. 3, for performing the injection velocity control is performed while correcting an injection velocity command by injection pressure control in the same manner as that of the prior art.

When injection is performed with the injection velocity data V (V0) which was used in the resin flow analysis (with the switch SW in an OFF state), injection pressure data detected by the pressure sensor 9 when pressure detected by the pressure sensor attached at the resin inlet port in the die is almost equal to the pressure at the resin inlet port in the die obtained by the resin flow analysis is schematically shown as Pf in FIG. 8. As shown in FIG. 8, the actual injection pressure curve Pf is an injection pressure curve on which an actual time lag caused by compression of resin in the cylinder and the nozzle of an injection molding machine including mechanical characteristics is reflected.

If the range of a flow analysis is extended so as to cover not only the inside of the die but also the nozzle portion of the molding machine, that is, not restricting to the inside of the die only, and, injection pressure data P2(N) is computed by using the resin pressure Pn(N) at the nozzle end portion on the molding machine side according to the model equation expressed by Equation (3), the obtained pressure is almost the same as the results described above, $$P2(N) = \begin{cases} Pa(N) & (N < \text{Ndelay}) \\ Pn(N - \text{Ndelay}) & (N \geq \text{Ndelay}). \end{cases} \quad (3)$$

Alternatively, a pressure loss analysis for the nozzle portion of the molding machine is additionally performed to obtain a pressure loss Ploss in the area extending from the resin inlet port in the die to the nozzle end portion on the molding machine side, and a resin pressure curve Ps at the resin inlet port in the die and the pressure loss Ploss are added to each other to obtain an equivalent of the resin pressure curve Pn(N) of the nozzle end portion on the molding machine side expressed by Equation (3). In other words, an injection pressure curve P3(N) can be obtained by the model equation of Equation (4) by substituting the resultant value to Equation (3), and almost the same result as in Equation (3) described above can be obtained:

$$P3(N) = \begin{cases} Pa(N) & (N < \text{Ndelay}) \\ Ps(N - \text{Ndelay}) + \text{Ploss}(N - \text{Ndelay}) & (N \geq \text{Ndelay}). \end{cases} \quad (4)$$

Dividing analysis regions into the inside of the die and the nozzle portion has the advantage that when the molding machine is changed but the die is not, Pn is obtained by performing a pressure loss calculation in the nozzle portion, taking the change of the nozzle shape into consideration, and adding the result and the pressure curve Ps at the resin inlet port of the die. In actual molding, pressure loss of a portion extending from the pressure sensor of the molding machine to the resin inlet port of the die includes pressure loss at the nozzle portion and the pressure loss in the cylinder. However, the pressure loss in the cylinder is smaller than that of the nozzle portion, and the pressure loss in the cylinder gradually decreases with forward movement of the screw. For this reason, a method in which the pressure loss in the cylinder is neglected and only the resin pressure loss of the nozzle portion of the molding machine is considered can be used. The nozzle portion may be modeled with one-dimensional elements or three-dimensional elements. Since the nozzle generally has a circular section, it is effective in making a modeling operation easy and in shortening analysis time that the nozzle portion is modeled so that it is discretely divided into one-dimensional elements and the diameter or radius of the section serving as element information is given as attributes of the element. It is preferable that the inside of a die is analyzed by a flow analysis using three-dimensional elements having a high accuracy, and the simple nozzle portion having an axially symmetrical structure is analyzed by the one-dimensional elements, because a highly accurate analysis can be preferably performed at a high speed.

Figure 9:
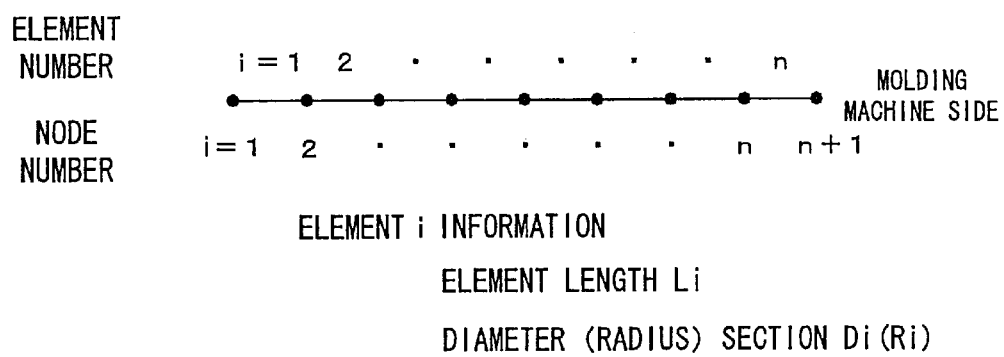
FIG. 9 is a diagram of a model discretely divided into one-dimensional elements of a nozzle.
Figure 10:
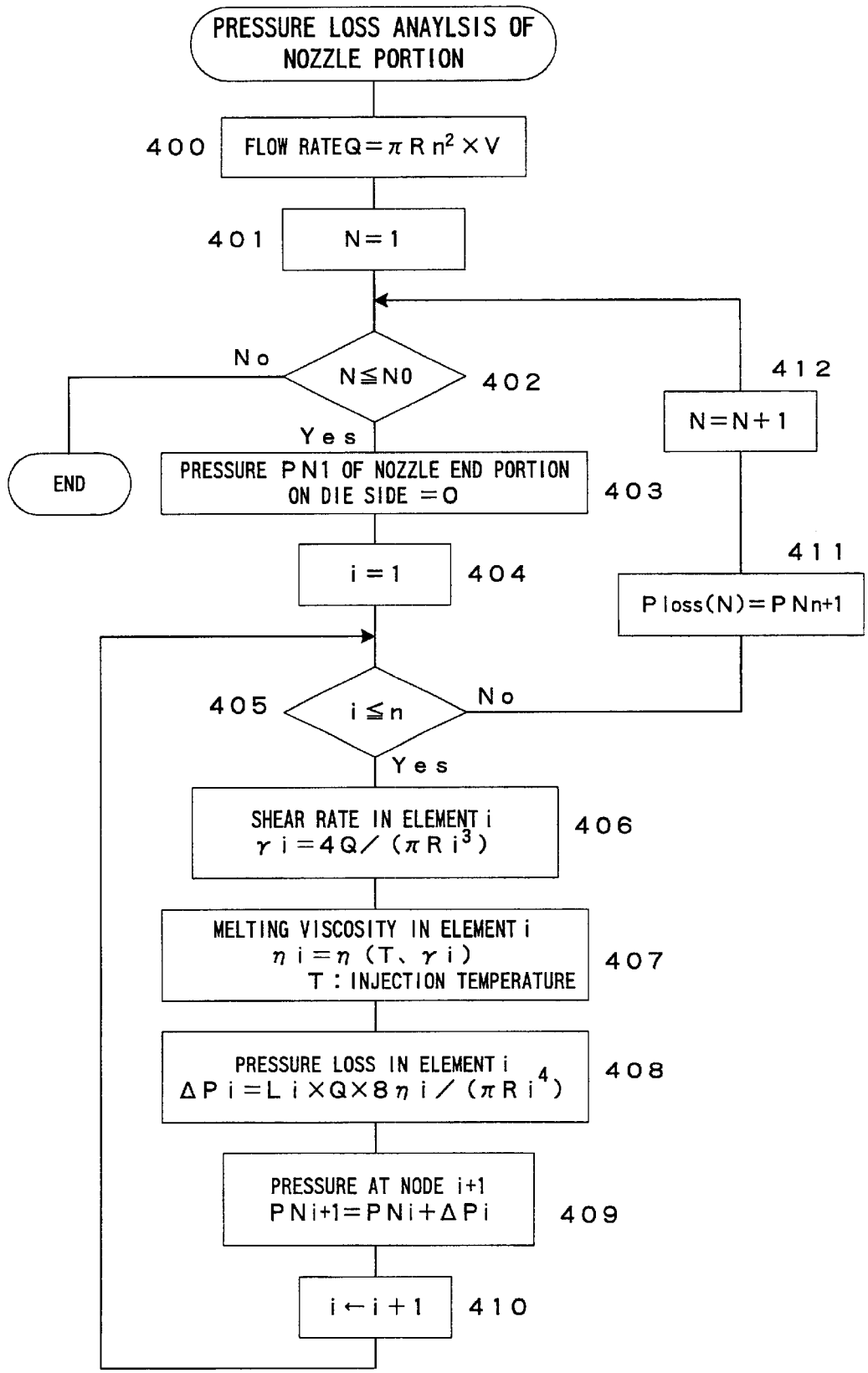
FIG. 10 is a flow chart of a pressure loss analysis of a nozzle portion.

FIG. 9 shows the nozzle shape which is modeled by discretely divided into one-dimensional elements. When the nozzle portion is divided into n elements, element numbers 1 to n are assigned to from the die side to the molding machine side, while any element number i is in between a nodes i and i+1. In this case, the elements can be easily understood. The radius of the section of an elements i is represented by Ri FIG. 10 shows a flow chart of a pressure loss analysis at the nozzle portion with respect to the nozzle shape which is modeled such that the nozzle shape is divided by one-dimensional elements into n elements. A program for the pressure loss analysis process has been stored in the memory 31.

A flow rate Q is obtained in step 400 by multiplying injection velocity data V(V0) used in a flow analysis by the sectional area $\pi Rn^2$ of the nozzle end portion on the molding machine side. In step 401, the counter N representing time information discretely sampled by a sampling period is set to be "1", and a sum of resin pressure losses PN1 of the nozzle end portion on the die side is set to be "0" (step 403), a shear rate $\gamma i$ in the elements i is calculated based on the following Model Equation (5) in a cylindrical tube (step 405):

$$\gamma i = 4Q/(\pi Ri^3) \quad (5)$$

where Ri is the radius at the element i.

In the next step 406, a melting viscosity $\eta i$ in the element i is calculated from a resin temperature T (note that this resin temperature is estimated experientially from a temperature set at the nozzle. For example, the resin temperature is determined by adding 10° C. to the set temperature of the nozzle.) and the shear rate $\gamma i$ according to a viscosity model equation expressed by Equation (6):

$$\eta i = A \times \gamma i^B \times \text{Exp}(C \times T) \quad (6)$$

where A, B, and C are constants. In step 408, a pressure loss $\Delta Pi$ in the element i is obtained from a flow pressure loss equation in a cylindrical tube expressed in Equation (7), and a sum of pressure losses PNi+1 at the node i+1 is obtained by adding the pressure loss $\Delta Pi$ to the sum of pressure losses PNi at the node i (step 409):

$$\Delta Pi = Li \times Q \times 8\eta i/(\pi Ri^4) \quad (7).$$

Where, Li represents a length of the element i; Ri represents a radius of the element i; and $\eta i$ represents a melting viscosity in the element i. These data have been inputted in advance.

The element number i is changed to i+1 (step 410), and the processing returns to step 405 and the processor 30 executes the processes in steps 406 to 410 until i exceeds n, so that a sum of pressure losses PNn+1 at a node of the nozzle end portion on the molding machine side is calculated. The processor 30 stores the calculated a sum of pressure losses PNn+1 as Ploss(N) (step 411). In step 412, the counter N is incremented by "1", the operations in steps 402 to 412 are repeated until the value of the counter N is equal to the number of data N0 of the resin pressure at the resin inlet port obtained by the resin flow analysis to calculate a pressure loss curve Ploss(N).

As described above, the difference between the pressure detected by a pressure sensor arranged on the screw of the molding machine and the pressure at the resin inlet port of the die is generated by a pressure loss caused between a point where the resin pressure is detected by the pressure sensor and the resin inlet port. According to the knowledge of the present inventors, a large part of the pressure loss is a pressure loss at the nozzle portion where the variation of diameter with respect to position is large, in comparison with the cylinder portion. In addition, though the influence of the pressure loss at the cylinder portion gradually decreases with forward movement of the screw, the loss at the nozzle portion always exists. Therefore, if an analysis is performed by using Equation (3) or Equation (4) in consideration of the pressure loss at the nozzle portion of the molding machine, the foregoing influence can be reduced. As a matter of course, if an analysis is performed in further consideration of the pressure loss at other portions such as the cylinder portion, in addition to the nozzle portion, then an analysis accuracy is improved. Injection pressure data P1 to P3 obtained from Equations (2) to (4) and the actually measured injection pressure data Pf coincides well with each other as shown in FIG. 8 when the compressibility of the resin is low and pressure dependence of the melting viscosity $\eta$ is low. However, when the compressibility of the resin is high, and the pressure dependence of the molting velocity $\eta$ is high, the injection pressure data P1 to P3 may not always coincide well with the injection pressure data Pf. This is because a phenomenon (pressure dependence of viscosity) in which a fluidity is degraded by a pressure loss or pressurization occurring at a vena contracta, the section of which is sharply constricted, such as a portion where resin flows from the nozzle end portion into the die is not considered.

Therefore, in use of resin having a high compressibility, when a resin flow analys is performed using Equation (3) for a region from the inside of the die to the nozzle portion of the molding machine, or when a flow analysis for obtaining the pressure at the nozzle end portion on the molding side is performed using Equation (4), it is effective to obtain the resin pressure curve Pn at the nozzle end portion on the molding side by taking into consideration a pressure loss generated by the vena contracta such as the nozzle end portion or the pressure dependence of melting viscosity in an analysis of at least the nozzle portion. The influences of these phenomena are large at the nozzle portion where the section is sharply constricted to make a vena contracta and a pressure higher than that of the die is generated. To cope with this influence, it is preferable that a resin pressure Ps at the resin inlet port in the die is obtained in advance using Equation (4) by a resin flow analysis for the inside of the die which does not consider these influences, and that when obtaining the pressure loss Ploss at the nozzle portion, a pressure loss analysis at the nozzle portion in consideration of a pressure loss at the vena contracta or a pressure dependence of viscosity is performed by using the resin pressure Ps at the resin inlet port in the die as a boundary condition to obtain a resin pressure curve Pn at the nozzle end portion on the molding machine side, so that the resin pressure curve Pn is set as an injection pressure P. This method is more effective in efficiency of analyzing time, though less in accuracy than the method which performs an analysis by using Equation (3) in consideration of the pressure loss at the vena contracta or the pressure dependence of viscosity.

One example of the model equation of a pressure loss ΔP at the vena contracta is expressed in Equation (8).

$$\Delta P = C1 \times \tau^{C2} \quad (8)$$

where C1 and C2 are constants, τ is a shearing stress which is calculated by $\tau = \eta \times \gamma$.

One example of the model equation of a melting viscosity in consideration of a pressure dependence is expressed in Equation (9). In Equation (9), a reference symbol T denotes the resin temperature, and a reference symbol P denotes the pressure. In addition, a reference symbol D3 denotes a coefficient representing pressure dependence of viscosity. The larger the value of the coefficient D3 is, the larger the pressure dependence is.

$$\eta(T, \gamma, P) = \eta 0(T, P)/\{1+(\eta 0 \times \gamma/\tau^*)^{1-n}\} \quad (9)$$

Where, $$\eta 0(T, P) = D1 \times \mathrm{Exp}\{-A1(T-D2-D3 \times P)/(A2+T-D2)\}$$

Where A1, A3, D1, D2, D3, τ*, and n are constants.

Therefore, when resin having high pressure dependence of the melting viscosity η is used, in the process in FIG. 10, the pressure at the resin inlet port obtained by the resin flow analysis is applied to the pressure at the nozzle end portion on the die side in step 403, the operation in Equation (9) is performed in step 407 to calculate a melting viscosity η(T, γ, P). In this case, a reference symbol T denotes melting resin temperature, and a sum of pressure losses PNi calculated in steps 403 and 409 may be used as P. In addition, when a pressure loss is calculated in step 408, the operation expressed in Equation (8) is executed to the nozzle end (i=1) where the section of the nozzle sharply changes in the structure of the injection molding machine, and the resultant value is set as a pressure loss generated at the portion where the section sharply changes. The pressure loss is added to the pressure loss obtained by Equation (7) in step 408, so that the pressure loss at the portion where the pressure dependence of viscosity and the section sharply change is calculated.

In this case, as described above, since the pressure at the resin inlet port obtained by the resin flow analysis is applied to the pressure at the nozzle end portion on the die side in step 403, not only the pressure loss at the nozzle portion, but also all pressure losses at the nozzle end portion on the molding machine side in the case where the die 1 is mounted are obtained.

Figure 11:
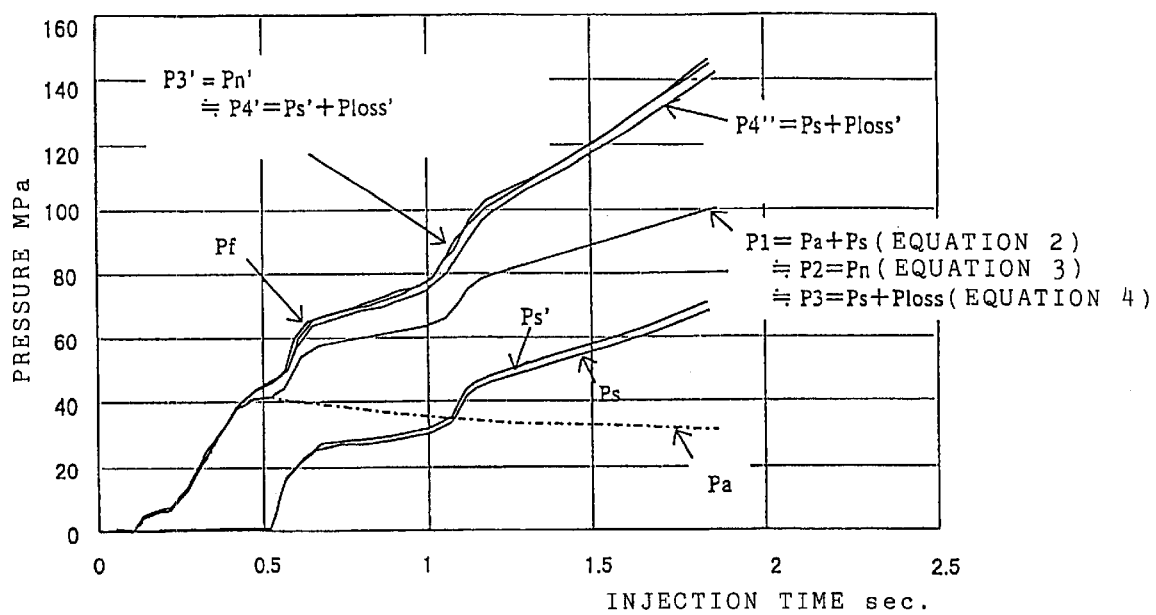
FIG. 11 is a graph showing the waveforms of various injection outputs in the embodiment.

FIG. 11 is a graph showing injection pressures obtained when an ABS resin is injected and molded at a predetermined constant velocity in a die of a plate product by a side gate, according to this embodiment. When the ABS resin or the like which has compressibility and pressure dependence of the melting viscosity η which are higher than those of a nylon resin is used, an injection pressure curve obtained from a model equation of Equation (3) or Equation (4) by using a resin flow analysis or pressure loss analysis results obtained in consideration of a phenomenon in which a fluidity is degraded by a pressure loss or pressurization occurring at a vena contracta, the section of which is sharply constricted, such as a portion where resin flows from the nozzle end portion into the die can be obtained in a form which is almost equal to that of the actual injection pressure curve Pf as shown in FIG. 11.

As described above, the steps of the method of forming injection molding conditions according to the present invention are preferably realized by an independent computer or a computer provided on the injection molding machine, which executes the program.

The program (a processing program in an air shot, a pressure rigidity processing program, a pressure loss analysis processing program, a resin flow analysis program, or the like) may be distributed through a computer readable storage medium such as a fixed magnetic disk or a CD-ROM in which the program is stored or electronically distributed through a wired or wireless transmission medium.

According to the present invention, since the result of resin flow analysis by using cae can be obtained as molding conditions for molding in mass production by obtaining air shot data in which resin and the mechanical characteristics of the parts of an injection molding machine such as a cylinder are taken into consideration, the molding conditions can be easily formed

What is claimed is:

1. An injection molding condition forming method comprising the steps of:

obtaining a resin pressure curve at a resin inlet port of a die by a resin flow analysis for analyzing a flow of resin in the die;

obtaining an injection pressure curve in an air shot; and obtaining an injection pressure curve serving as a molding condition based on the injection pressure curve in the air shot and the resin pressure curve obtained by the resin flow analysis.

2. An injection molding condition forming method in an injection molding machine according to claim 1, wherein in the step of obtaining an injection pressure curve serving as the molding condition, the injection pressure curve in the air shot is used as the injection pressure curve serving as the molding condition during a lag time between the start of injection by the molding machine and injection of resin from the nozzle end, and thereafter, the resin pressure curve at the resin inlet port of the die and the injection pressure curve in the air shot are added to each other, and the addition result is used as the injection pressure curve serving as the molding condition.

3. An injection molding condition forming method in an injection molding machine according to claim 1, further comprising the step of calculating a pressure loss curve in an area extending from the pressure sensor to the resin inlet port of the die by the resin flow analysis, and wherein, in the step of obtaining an injection pressure curve serving as the molding condition, the injection pressure curve in the air shot is used as the injection pressure curve serving as the molding condition during a lag time between the start of injection by the molding machine and injection of resin from the nozzle end, and thereafter, the resin pressure curve at the resin inlet port of the die and the pressure loss curve in the area extending from the pressure sensor to the resin inlet port of the die are added to each other, and the addition result is used as the injection pressure curve serving as the molding condition.

4. An injection molding condition forming method in an inject molding machine comprising the steps of:

obtaining a resin pressure curve of a cylinder-side end of a molding machine nozzle portion obtained by a resin flow analysis using a resin flow path in a die and the nozzle portion of the molding machine as objects to be analyzed;

obtaining an injection pressure curve in an air shot; and obtaining an injection pressure curve serving as a molding condition based on the injection pressure curve in the air shot and the resin pressure curve obtained by the resin flow analysis.

5. An injection molding condition forming method in an injection molding machine according to claim 4, wherein, in the step of obtaining an injection pressure curve serving as the molding condition, the injection pressure curve in the air shot is used as the injection pressure curve serving as the molding condition during a lag time between the start of injection by the molding machine and injection of the resin from a nozzle end, and thereafter, the resin pressure curve obtained by the resin flow analysis is used as the injection pressure curve serving as the molding condition.

6. An injection molding condition forming method according to claim 4, wherein, in at least the resin flow analysis of the nozzle portion, an analysis in consideration of a pressure dependence of a resin viscosity is performed.

7. A molding condition forming method in an injection molding machine according to claim 1, wherein, in the step of obtaining an injection pressure curve in the air shot, the injection pressure curve is formed under a new condition based on known air shot injection pressure curves data stored in storage means in which known injection pressure curves data in air shots that are actually measured under various conditions are stored.

8. A molding condition forming method in an injection molding machine according to claim 1, wherein, in the step of obtaining an injection pressure curve in the air shot, an injection pressure curve in an air shot with respect to a resin temperature and an injection velocity of the molding conditions in the molding is formed by interpolating actually measured injection pressure curve data for air shots performed at plurality of levels of resin temperatures and injection velocities for the same shape of the cylinder and that of the nozzle of the molding machine and the same resin to use.

9. An injection molding machine comprising:
  means for storing a resin pressure curve at a resin inlet port of a die calculated by a resin flow analysis for analyzing a flow of resin in the die;
  means for obtaining an injection pressure curve in an air shot; and
  means for obtaining an injection pressure curve serving as a molding condition based on the injection pressure curve in the air shot and the resin pressure curve obtained by the resin flow analysis.

10. An injection molding machine according to claim 9, wherein, in the means for obtaining an injection pressure curve serving as the molding condition, the injection pressure curve in the air shot is used as the injection pressure curve serving as the molding condition during a lag time between the start of injection by the molding machine and injection of resin from a nozzle end, and thereafter, the resin pressure curve at the resin inlet port of the die and the injection pressure curve in the air shot are added to each other, and the addition result is generated as the injection pressure curve serving as the molding condition.

11. An injection molding machine according to claim 9, further comprising the means for performing a resin flow analysis to a pressure loss curve in an area extending from a pressure sensor to the resin inlet port of a die, and wherein, in the means for obtaining an injection pressure curve serving as the molding condition, the injection pressure curve in the air shot is used as the injection pressure curve serving as the molding condition during a lag time between the start of set injection and injection of resin from a nozzle end, and thereafter, the resin pressure curve at the resin inlet port of the die and the pressure loss curve extending from the pressure sensor to the resin inlet port of the die are added to each other, and the addition result is generated as the injection pressure curve serving as the molding condition.

12. An injection molding machine comprising:
  means for storing a resin pressure curve of a cylinder-side end of a nozzle portion of a molding machine obtained by a resin flow analysis using a resin flow path in a die and a nozzle portion of the molding machine as objects to be analyzed;
  means for obtaining an injection pressure curve in an air shot; and
  means for obtaining an injection pressure curve serving as a molding condition based on the injection pressure curve in the air shot and the resin pressure curve obtained by the resin flow analysis.

13. An injection molding machine according to claim 12, wherein, in the means for obtaining an injection pressure curve serving as the molding condition, the injection pressure curve in the air shot is used as the injection pressure curve serving as the molding condition during a lag time between the start of injection and injection of the resin from a nozzle end, and thereafter, an injection pressure curve is generated by using the resin pressure curve obtained by the resin flow analysis as the molding condition.

14. An injection molding machine according to claim 9, further comprising storage means for storing injection pressure curve data in an air shot and actually measured under various conditions, and wherein, in the means for obtaining an injection pressure curve in the air shot, an injection pressure curve under a new condition is formed based on known air shot injection pressure curves data stored in storage means.

15. An injection molding machine according to claim 9, further comprising storage means for storing actually measured injection pressure curves data in air shots performed at a plurality of levels of resin temperature and injection velocities for the same shape of the cylinder and that of the nozzle of the molding machine and the same resin, and wherein, in the means for obtaining an injection pressure curve in the air shot, the actually measured injection pressure curves data stored in the storage means are interpolated, so that an injection pressure curve in an air shot with respect to a resin temperature and an injection velocity of the molding conditions in the molding is formed.

16. An injection molding condition forming apparatus comprising:
  a resin flow analyzing device for obtaining a resin pressure curve at a resin inlet port of a die by a resin flow analysis for analyzing a flow of resin in the die and
  an injection molding machine for obtaining an injection pressure curve in an air shot,
    wherein the injection molding machine calculates an injection pressure curve serving as a molding condition based on the resin pressure curve given by resin flow analyzing device and the injection pressure curve in the air shot.

17. An injection molding condition forming apparatus comprising;
  a resin flow analyzing device for obtaining a resin pressure curve of a cylinder-side end of a molding machine nozzle portion by a resin flow analysis using a resin flow path in a die and the nozzle portion of the molding machine as objects to be analyzed, and
  an injection molding machine for obtaining an injection pressure curve in an air shot,
    wherein the injection molding machine calculates an injection pressure curve serving as a molding condition based on the resin pressure curve given by the resin flow analyzing device and the injection pressure curve in the air shot.

18. A computer readable storage medium which stores a program for causing a computer of a control device for controlling an injection molding machine to execute:

the step of obtaining a resin pressure curve at a resin inlet port of a die by a resin flow analysis for analyzing a flow of resin in the die;

the step of obtaining an injection pressure curve in an air shot; and the step of obtaining an injection pressure curve serving as a molding condition based on the resin pressure curve obtained by the resin flow analysis and the injection pressure curve in the air shot.

19. A computer readable storage medium which stores a program for causing a computer of a control device for controlling an injection molding machine to execute:

the step of obtaining an injection pressure curve in an air shot; and the step of obtaining an injection pressure curve serving as a molding condition based on the injection pressure curve in the air shot obtained in the above step and a resin pressure curve of a resin inlet port at a die obtained by a resin flow analysis for analyzing an input flow of resin in the die.

20. A computer readable storage medium which stores a program for causing a computer of a control device for controlling an injection molding machine to execute:

the step of obtaining a resin pressure curve of a cylinder-side end of a nozzle portion of a molding machine obtained by a resin flow analysis using a resin flow path in a die and the nozzle portion of the molding machine as objects to be analyzed;

the step of obtaining an injection pressure curve m an air shot; and the step of obtaining an injection pressure curve serving as a molding condition based on the resin pressure curve obtained by the resin flow analysis and the injection pressure curve in the air shot.

21. A computer readable storage medium which stores a program for causing a computer of a control device for controlling an injection molding machine to execute:

the step of obtaining an injection pressure curve in an air shot; and the step of obtaining an injection pressure curve serving as a molding condition based on the injection pressure curve in the air shot obtained in the above step and a resin pressure curve of at a cylinder-side end of the molding machine nozzle portion obtained by a resin flow analysis using an input resin flow path in a die and the nozzle portion of a molding machine as objects to be analyzed.

* * * * *

UNITED STATES PATENT AND TRADEMARK OFFICE
CERTIFICATE OF CORRECTION

PATENT NO.     : 6,440,338 B1                                                    Page 1 of 1
DATED          : August 27, 2002
INVENTOR(S)    : Masao Kamiguchi et al.

It is certified that error appears in the above-identified patent and that said Letters Patent is hereby corrected as shown below:

Column 3,
Line 64, change "m" to -- in --.

Column 16,
Line 12, change "cae" to -- CAE --.

Column 20,
Line 6, change "m" to -- in --.

Signed and Sealed this

Twenty-eighth Day of January, 2003

JAMES E. ROGAN
*Director of the United States Patent and Trademark Office*